Patented June 7, 1927.

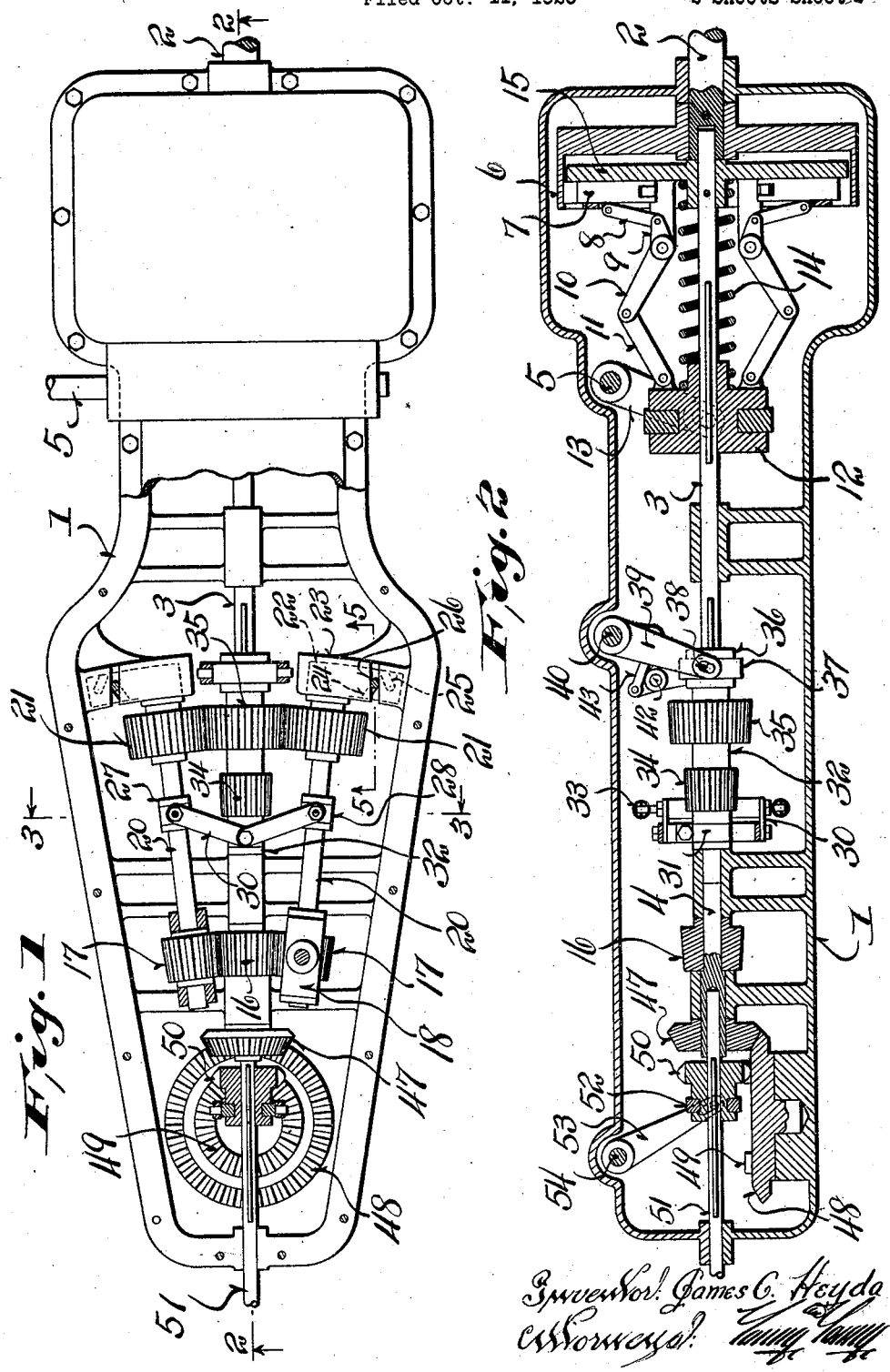

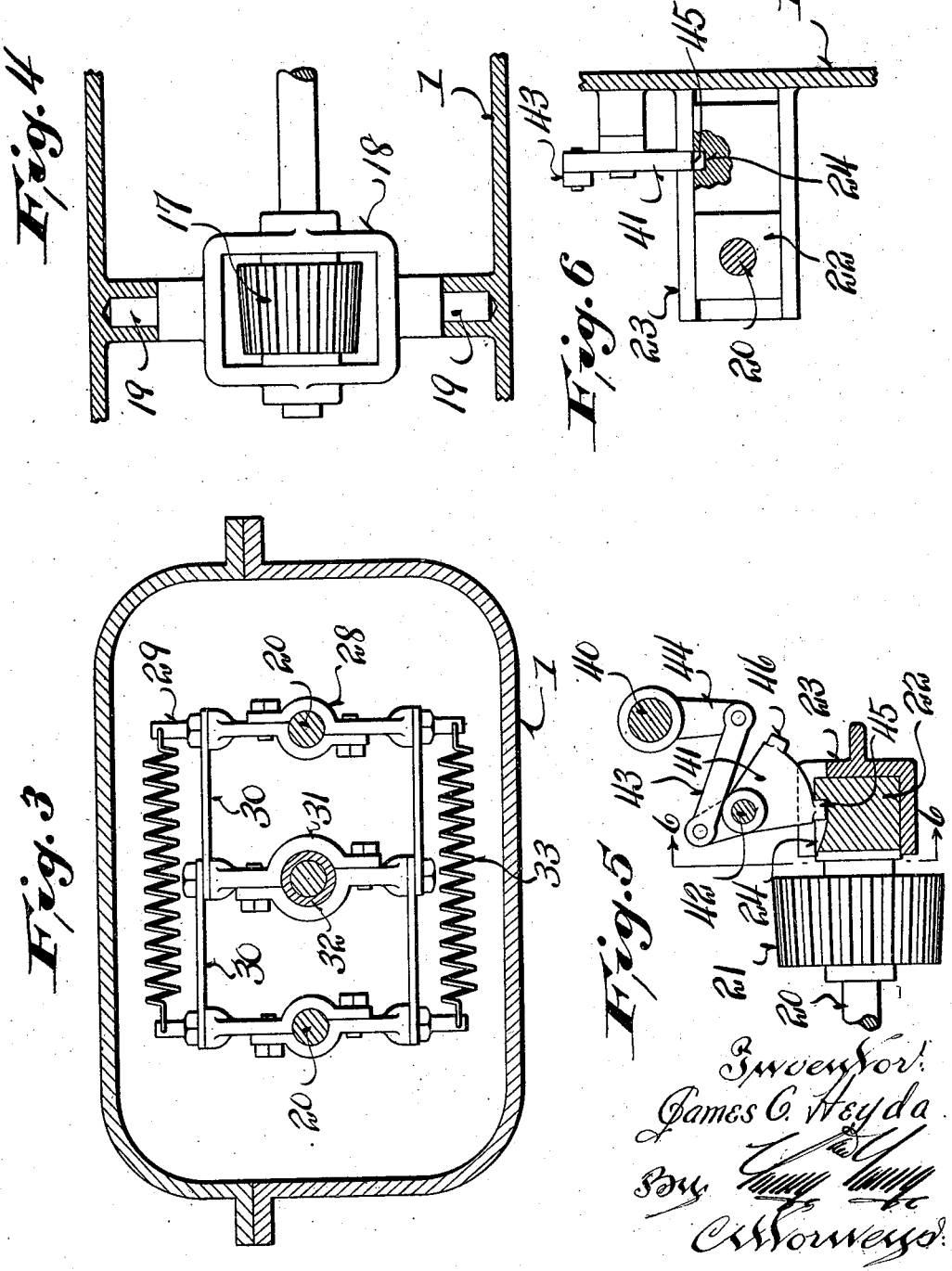

1,631,590

UNITED STATES PATENT OFFICE.

JAMES C. HEYDA, OF PITTSFIELD, WISCONSIN.

TRANSMISSION MECHANISM.

Application filed October 11, 1926. Serial No. 140,860.

This invention relates to transmission mechanism, and is particularly directed to a transmission mechanism for an automobile.

Objects of this invention are to provide a novel form of transmission mechanism in which the drive is balanced so that there are no unequal forces exerted upon the main drive shaft, but instead, in which the forces exerted upon the shaft are equally balanced on opposite sides, thus preventing vibration of the shaft or undue wear in the bearings for such shaft.

Further objects are to provide a novel form of transmission mechanism in which the change gears shift substantially laterally, and at the same time, certain of the gears shift longitudinally to be subsequently engaged upon inward lateral motion of the balanced gears.

Further objects are to provide a transmission mechanism of the type described above, in which a positive and reliable locking means is provided for locking the transmission in either of its two positions, so as to prevent inadvertent opening of the transmission gear train.

Further objects are to provide a novel and extremely simple type of reversing mechanism for the transmission to permit ready reversal of the drive.

Further objects are to provide a transmission in which the change from one drive to the other drive is easily manually controlled, and in which springs are provided for aiding in completing the change from one drive to another drive to thus cause the gears to snap into their new position.

An embodiment of the invention is shown in the accompanying drawings in which:—

Figure 1 is a plan view of the transmission with a part of the casing removed and with some of the parts in section, the upper springs and the upper portion of the locking means being omitted for the sake of clearness;

Figure 2 is a longitudinal sectional view on the line 2—2 of Figure 1;

Figure 3 is an enlarged transverse view on the line 3—3 of Figure 1;

Figure 4 is a detail of one of the pivotally mounted gears;

Figure 5 is a detail partly in section approximately on the line 5—5 of Figure 1;

Figure 6 is a side elevation partly in section corresponding to the line 6—6 of Figure 5.

Referring to the drawings, it will be seen that the transmission is carried within a housing 1. The engine shaft 2 projects into the forward end of the housing, as shown most clearly in Figure 2. The main drive shaft 3 is carried in axial alignment with the engine shaft 2, and the end shaft or driven shaft 4 is mounted in axial alignment with the shaft 3, so that in reality, there are three shafts, 2, 3, and 4, forming a straight line through the transmission mechanism.

The shaft 3 preferably is socketed within the shaft 2 at its forward end and may be coupled thereto in driving relation by means of the clutch mechanism illustrated in Figure 2, and controlled by the clutch rock shaft 5. This clutch mechanism may comprise a drum 6 against which shoes 7 are forced by means of the links 8 and levers 9. The levers 9 are provided with relatively long arms 10 which are connected by means of links 11 with a sliding block 12, loosely splined upon the shaft 3. This sliding block is operated by means of levers 13 rigid with the clutch rock shaft 5. Preferably, a spring 14 is interposed between the driven disc or plate 15 and the block or cross head 12, such spring being conveniently carried by hubs projecting from these members. It is to be noted that the disc 15 guides the shoes 7 and is rigidly secured to the shaft 3. Thus, when the clutch is closed, the shoes 7 engage the drum 6 and are held in engagement by means of the spring 14, and an operative drive is established between the shafts 2 and 3.

The shaft 4 is provided with a rigidly mounted gear 16, as shown in Figures 1 and 2. This gear 16 meshes with a pair of pivotally mounted gears 17, such latter gears being positioned on opposite sides of the gear 16 in a balanced relation, so that the thrust from the gears is balanced with regard to the shaft 4. The gears 17, as shown most clearly in Figure 4, are carried in small frames or bearings 18 which are provided with upper and lower pivots or trunnions 19 seated within sockets formed in the transmission casing, such transmission casing being preferably formed of two main members or parts, as indicated in the drawings.

The gears 17 are rigidly carried by slanting jack shafts 20 (see Figure 1), such shafts carrying at their other ends rigidly mounted gears 21. The ends of the shafts 20 are carried in sliding blocks 22 shown in dotted lines in Figure 1, and in section in Figure 5. These sliding blocks are guided within rectangular guides 23 rigidly formed with the lower half of the transmission casing. Further, it is to be noted that the sliding blocks are provided with reversely slanting and directed slots 24 and 25, the inner slot slanting in one direction and the outer slot slanting in the other direction, and as stated, opening through opposite faces of the sliding blocks. Further, it is to be noted, that the channel shaped guides 23 are provided with transverse slots 26 across their top faces. The purpose of these slots will be hereinafter described.

Each of the shafts 20 is provided with a pair of spaced collars 27 between which bearing members 28 are held. These bearing members 28, as may be seen from Figure 3, are preferably formed from two separate and similar half sections which are bolted together or clasped around the shaft 20 to permit free rotation of the shaft. At their upper and lower ends, these bearing members 28 are provided with projecting pins 29 which form pivots for the toggle links 30. The inner ends of these toggle links are pivoted upon a sliding bearing member 31. This sliding bearing member encloses a portion of the sleeve 32, such sleeve having collars or enlargements between which the bearing member 31 works. Further, it is to be noted that springs 33 are positioned between the pins 29 and tend to draw upon the bearing members 28 towards each other, and to thus draw the free ends or rocking ends of the shaft 20 towards each other.

It is to be noted from Figures 1 and 2, that the sleeve 32 rigidly carries a small gear 34 and a larger gear 35. Further, it is to be noted that this sleeve is provided with collars 36 at its forward end between which a ring 37 is mounted. The ring is provided with projecting pins 38 which work in slots formed in the shift lever 39, such shift lever being carried rigidly by the transverse rock shaft 40. Further, it is to be noted that the sleeve 32 is loosely splined to the shaft 3, as may be seen from Figure 2.

From the mechanism thus far described, it is apparent that when the shaft 40 is rocked that the sleeve 32 is shifted axially of the shaft 3, and that the toggle links force the shafts 20 apart and disengage the gears 21 from the gear 35. Thereafter, the gear 35 shifts completely out of the range of the gears 21, and the gear 34 takes its place. Continued motion of the sleeve, which is also aided by the springs 33, tending to contract the toggle levers, results in the inward motion of the gears 21 into engagement or into mesh with the gear 34. Thus, the ratio between the shaft 3 and the shaft 4 is readily altered by merely rocking the shaft 40. In addition to this, the gears go into mesh under the additional urge of the springs 33, so that a quick snap or quick action is secured by this mechanism with assurance that the gears will be positively in mesh. This avoids the chipping of the corners of the gears, as has heretofore been the objection to the ordinary sliding type of gear in an automobile transmission.

Additional means are provided for locking the sliding blocks 22 in either extreme position. For instance, as shown in Figure 5, segmental members 41 are carried by or pivoted upon a supporting shaft 42. These members are operated by means of a link 43 connecting them with a lever 44 carried rigidly by the rock shaft 40. Further, it is to be noted that the segmental members are provided with pins or projections 45 and 46, which rock within the slots 26 formed in the guides 23 and respectively enter the slots 24 or the slots 25.

These slots are so slanted, as shown in Figure 1, that they accommodate the inward motion of the blocks while the gears 21 go into mesh with either the gear 34 or the gear 35. Obviously, after the pins or ears 45 or 46 have engaged their appropriate slots, the gears 21 are locked in mesh with the selected gear 34 or 35. In other words, the member 45 enters the slot 24 at one locked position, and the member 46 enters the slot 25 in the other locked position. The slot 26 serves as a guide for the rocking member 41.

The shaft 4 carries a bevel gear 47 which meshes with a horizontal bevel gear 48. This bevel gear 48 is formed integral with a second or inner gear 49, as shown in Figures 1 and 2. The gear 49 meshes with a sliding gear 50 slidably keyed to the driven shaft 51. This driven shaft 51 is carried at one end in a bearing formed in the casing 1, and at its other end is socketed within the shaft 4 at the point where the shaft 4 is carried within its bearing. The gear 50 is provided with a slot within which a ring 52 is mounted. The ring 52 is pivoted by means of the levers 53 carried by the rock shaft 54. The shaft 54 constitutes the reversing shaft, for it will be seen that when the gear 50 is rocked from the position shown in Figure 1, to the other side, that the direction of rotation of the shaft 51 is reversed as it then meshes with the gear 49 on the opposite side from that at which it initially meshed.

It will be seen that a novel form of transmission has been provided by this invention in which a balanced drive is secured through the jack shafts and the peculiar mode in which they are operated.

Further, it will be seen that the change gears are locked in mesh in their respective adjustments.

It will be seen further that the change from one speed to another speed may be very readily secured by this mechanism. Further, it is to be noted that two forward speeds and two reverse speeds are also provided.

Although the invention has been described in considerable detail, such description is intended as illustrative rather than limiting as the invention may be variously embodied and as the scope of such invention is to be determined as claimed.

I claim:

1. A transmission mechanism comprising two coaxial shafts, one of said shafts having a pair of gears slidably keyed thereto, the other of said shafts having a gear rigid thereon, a pair of rocking jack shafts having gears meshing with the rigidly mounted gear and having gears at their free ends adapted to be rocked inwardly or outwardly, and means for shifting said slidably mounted gears and simultaneously rocking said jack shafts to cause the gears at the free ends of said jack shafts to engage either of said slidably mounted gears.

2. A transmission mechanism comprising a shaft having a sliding sleeve splined thereon provided with a large gear and a small gear, means for shifting said sleeve, a second shaft having a rigidly mounted gear, a pair of jack shafts pivotally mounted adjacent one end and provided with gears meshing with said last mentioned gear and having gears adapted to mesh with either the large gear or the small gear.

3. A transmission mechanism comprising a shaft having a sliding sleeve splined thereon provided with a large gear and a small gear, means for shifting said sleeve, a second shaft having a rigidly mounted gear, a pair of jack shafts pivotally mounted adjacent one end and provided with gears meshing with said last mentioned gear and having gears adapted to mesh with either the large gear or the small gear, and means for rocking the free ends of said jack shafts inwardly and outwardly.

4. A transmission mechanism comprising a shaft having a sliding sleeve splined thereon provided with a large gear and a small gear, means for shifting said sleeve, a second shaft having a rigidly mounted gear, a pair of jack shafts pivotally mounted adjacent one end and provided with gears meshing with said last mentioned gear and having gears adapted to mesh with either the large gear or the small gear, and means for rocking the free ends of said jack shafts inwardly and outwardly, said means being operatively connected with the sleeve.

5. A transmission comprising a shaft having a sleeve slidably splined thereon and provided with a large gear and a small gear, a second shaft axially aligned with said first mentioned shaft and having a rigidly mounted gear, a pair of jack shafts having gears at one end located on opposite sides of and meshing with said rigidly mounted gear, said jack shafts being pivotally mounted adjacent said end and each having a gear adjacent the other end adapted to mesh with either said large gear or said small gear, and toggle mechanism operated by said sleeve for moving the gears at the free end of said jack shaft into or out of mesh with said large gear and said small gear.

6. A transmission comprising a shaft having a slidably splined sleeve mounted thereon and provided with a large and a small gear, a pair of jack shafts mounted on opposite sides of said first mentioned shaft, toggle mechanism for rocking said jack shafts inwardly or outwardly with reference to said first mentioned shaft, said toggle mechanism being operatively connected to said sleeve, a pair of channel shaped guides, blocks forming bearings for the ends of said jack shafts and slidably mounted in said guides, a rocking locking member actuated to lock said blocks in either extreme position, a second shaft mounted in alignment with said first mentioned shaft and having a gear thereon, a pair of gears carried by the ends of said jack shafts and meshing with said last mentioned gear, and pivotal bearings carrying the said jack shafts and permitting free swinging motion thereof, said jack shafts having gears at their free ends adapted to mesh with said large or said small gear when said blocks are locked.

In testimony that I claim the foregoing I have hereunto set my hand at Pittsfield, in the county of Brown, and State of Wisconsin.

JAMES C. HEYDA.